April 4, 1944. F. H. OGDEN 2,346,046
CUTTING MACHINE
Filed Sept. 2, 1943 2 Sheets-Sheet 1
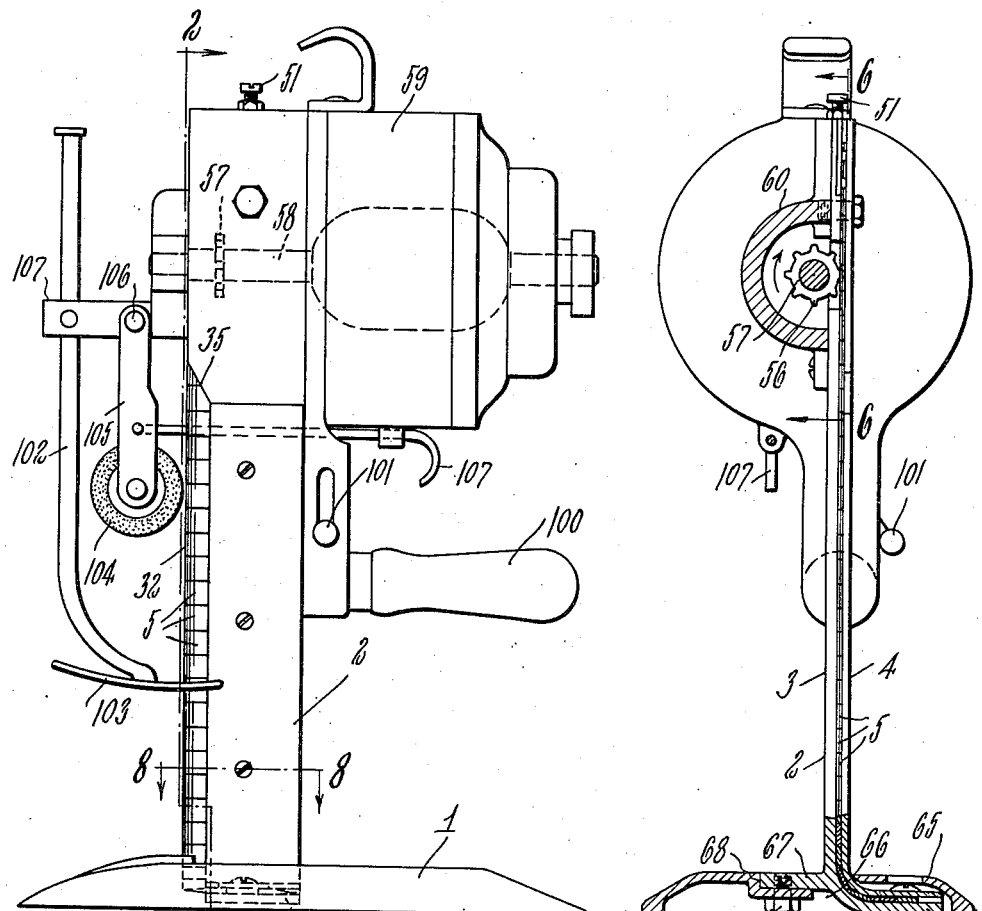
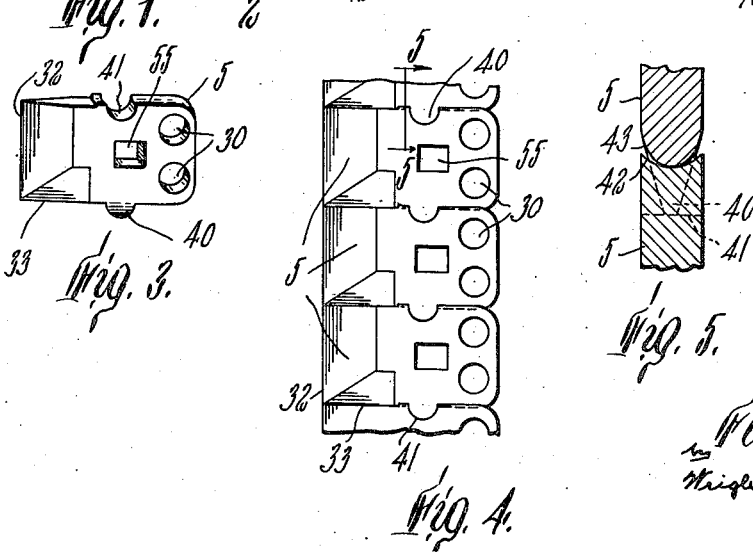
Inventor
Floyd H. Ogden
Wright Brown Quimby Ma
Attys.

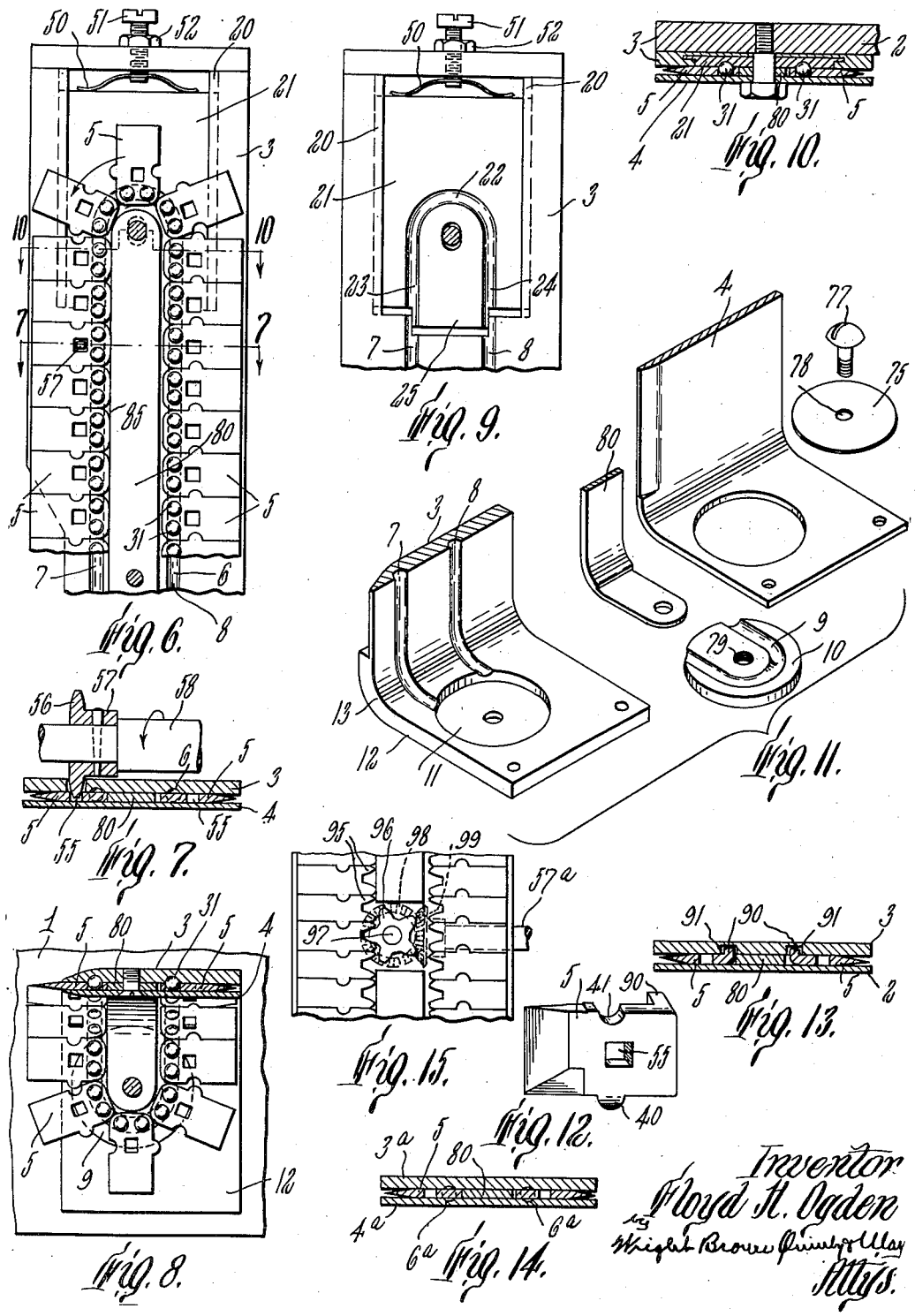

Patented Apr. 4, 1944

2,346,046

UNITED STATES PATENT OFFICE 2,346,046

CUTTING MACHINE

Floyd H. Ogden, Arlington, Mass.

Application September 2, 1943, Serial No. 500,901

14 Claims. (Cl. 30—274)

This invention relates to machines for cutting cloth or the like, and more particularly where the cloth is arranged in piles of substantial depth, the cloth of the entire pile being cut at the same time. Machines in general use for this purpose have been of two general types, the one using a rotary cutter running continuously in one direction, and the other employing a reciprocating straight knife. The rotary cutting machine is faster in operation since there are no idle periods as there are with the reciprocatory cutter, but as the cutting is on an arc, the cutting varies in depth between the top and bottom of the pile, so that close cutting where changes of direction occur is not possible. The reciprocating knife machine permits this close cutting.

An object of the present invention is to provide a continuous cutting motion in a straight path so as to embody the advantages of the rotary and reciprocating cutters, but without the disadvantage of either.

A further object is to provide a knife operating in a continuous path and having the return portion of the path directly behind and close to the cutting path so that minimum interference with the feed of the machine relative to the cloth is produced.

Still another object is to provide a cutter formed of a plurality of cutting elements which present a continuous cutting edge to the cloth, regardless of wear, and which are pushed continuously in one direction through a continuous path. By pushing the elements through this path, they are caused to follow one directly back of the other without intervening spaces.

A further object of the invention is to provide interlock between adjacent cutting elements tending to hold them against relative lateral displacement, but permitting them to be turned relative to each other in portions of the path where this is found desirable or necessary.

Another object is to provide simple anti-friction mounting for the cutting elements.

Still another object is to provide a fine adjustment for such anti-friction mounting.

Other objects and advantages will appear from a description of certain embodiments of the invention shown in the accompanying drawings in which Figure 1 is a side elevation of one machine embodying the invention.

Figure 2 is a sectional view on line 2—2 of Figure 1.

Figure 3 is a perspective view to a larger scale of one of the cutting elements.

Figure 4 is a fragmentary elevation of a plurality of cutting elements in normal cutting relation.

Figure 5 is a detail sectional view on line 5—5 of Figure 4, but to a larger scale.

Figure 6 is a detail sectional view on line 6—6 of Figure 2.

Figure 7 is a detail sectional view on line 7—7 of Figure 6.

Figure 8 is a detail sectional view on line 8—8 of Figure 1, but with the foot plate omitted.

Figure 9 is a view similar to a portion of Figure 6, but with the cutting elements omitted.

Figure 10 is a detail sectional view through the machine on line 10—10 of Figure 6.

Figure 11 is a fragmentary exploded perspective of the cutting element raceway parts at the lower portion of the machine.

Figure 12 is a view similar to Figure 3, but showing a modified construction.

Figure 13 is a horizontal cross sectional view through the standard showing cutting elements of the form shown in Figure 12.

Figure 14 is a view similar to Figure 13, but showing the cutting elements of Figure 3, but with a modified ball raceway construction.

Figure 15 is a view similar to a portion of Figure 6, but showing another modification.

Referring first to Figures 1 and 2, the machine as shown comprises a base 1, and a standard 2 rising from this base. The standard and a portion of the base comprise side members 3 and 4 spaced apart to permit a series of cutting blades 5 to move therebetween. One of these plates, as the plate 3, is shown as provided with a face groove 6 arranged to form a continuous path having a pair of straight vertical stretches 7 and 8. These stretches 7 and 8 are joined at their lower ends by a portion 9 (see Figures 8 and 11) substantially semicircular, this portion 9 being formed in a circular wear plate 10 which is seated in a circular socket 11 in the horizontally turned lower end portion 12 of the side plate 3. This horizontally turned portion 12 merges with the upright portion by a gradual curve at 13. At one end, herein shown as the upper end of the standard, it is provided with a vertical slideway 20, within which is slidable a slide 21, and this slide 21 has formed in one face an arcuate groove 22 having parallel side portions 23 and 24 which form continuations of the upper ends of the stretches 7 and 8 of the guide grooves of the standard plate 3.

As shown in Figure 9, the slide 21 has a central downwardly extending portion 25 which has formed therein one portion of the length of each of the stretches 7 and 8, the mating portion of which is formed in the plate 3. Thus the stretches 7, 8 and 22 are substantially uninterrupted, regardless of a considerable variation in the vertical position of the slide 21. The guide grooves in the base and standard thus define a continuous closed track for the guidance of the cutting elements 5. As shown best in Figures 3, 6, 7 and 8, each of the cutting elements 5 is provided with a pair of spaced holes 30 therethrough which form sockets for the reception of balls 31, these balls projecting from one face of each of the cutting elements or blades and into the groove 6, this groove thus forming a guideway for all the balls of the cutting blades and thus guiding these blades for motion in a closed path.

As shown in Figure 7, the plate 4, which comprises upper and lower portions as shown in Figure 1, is plane on its inner face and retains the blades and the balls in position. If desired, however, a portion of the ball guideway may be formed in this plate, for example, as shown in Figure 14, where the plate 4a is formed with grooves 6a opposite to the grooves of the plate 3a.

Beneath the slide 21 the forward edges of the plates 3 and 4 are cut back as at 35 in Figure 1 so as to expose the forward edges of the blades which are sharpened to form the forward cutting edges 32 (see Figure 3) and preferably a lower cutting edge 33. It is desirable that these blade elements present a continuous cutting edge, and means are therefore provided tending to retain the adjacent blades in accurate alinement within the straight cutting stretch. For this purpose, as shown best in Figures 3, 4, and 5, one edge of each of the blades 5 may have an arcuate projection 40 nesting within an arcuate depression 41 in the adjacent face of the next adjacent blade, and further in order to hold the cutting edges against lateral displacement, one edge of each blade, herein shown as the upper edge, is formed longitudinally concave as at 42, and the lower edge of the next adjacent blade is formed convex as at 43. As shown best in Figure 5, the convexity is at a smaller radius than the concavity so as to permit the blades to be deflected in a curve where they pass between the upright guideway of the standard and the horizontal guideway in the base within the wear piece 10, and for the same reason, the arcuate extensions 40 of each of the blades is beveled off so that as the blades are deflected laterally, the lower ends of the extensions will not pass outwardly beyond the side face of the next adjacent blade.

The slide 21 is normally pressed downwardly, as by means of a leaf spring 50, bearing at its ends on the upper edge of the slide, and adjustable at its central portion by means of the adjusting screw 51 provided with a lock nut 52 by which it may be secured in position. This spring allows the slide to yield whenever necessary, but tends to hold the slide downward to shorten the path for the balls as much as is permitted by the balls and the series of blades, and serve to take up any wear which may occur which might tend to permit the blades to separate from each other. It will be noted that as the blades pass through the straight stretches of their path, their side edges are pressed tightly together, while where they are passed around their arcuate end portions, they separate at their outer or cutting edges and remain in contact only toward their inner edges. It will be noted that the blades are entirely independent of each other, being not attached together in any manner. They are retained in this relationship and are caused to pass around their closed path by means which pushes the blades therethrough, thus keeping them tightly in contact with each other. It will be noted that each of the blades has an opening 55 herethrough and these openings of the blades are successively presented to teeth 56 of a driving wheel or pinion 57. This wheel 57 is shown as pinned to a drive shaft 58 which may be an armature shaft of a motor 59 carried at the upper end of the standard 2. An arcuate casing portion 60 encloses the shaft 57 as shown in Figure 2.

The endless track portion within the base, as best shown in Figure 2, may be more or less covered by a foot plate 65, which, as shown in this figure, has an opening 66 therethrough through which the lower end of the standard may be hooked in position, this standard having a foot 67 which seats in a depression 68 in the top face of the foot plate 65 where it is secured as by a screw 70.

In order to provide a fine adjustment for the horizontal arcuate portion of the blade track, the blades may be covered over by a disk 75 (see Figure 11) beneath which the blades may pass, this being adjustably secured by means of a screw 77 which passes through a central hole 78 in the disk 75, which provides a journal for this disk, the lower end of the screw 77 being threaded into a hole 79 of the wear plate 10. By this means the cutting elements, with the balls, are held in nice adjustment at this portion of the path where they turn from their downward to their upward stretches.

In order to take the rearward thrust of the cutting elements in their forward cutting stretch, a backing strip 80 may be secured between the plates 3 and 4, presenting a forward straight face 85 against which the rear edges of the cutting blades bear as they pass downwardly for their cutting stroke. On the up-stretch where the blades are idle, they are spaced from the rear edge of the back strip, and in this up-stretch, also, they do not project beyond the rear edges of the plates 3 and 4, so that they are not exposed for cutting.

Instead of using the balls 31, the blades may have integral therewith guide flanges 90, as shown in Figures 12 and 14, which ride within the generally rectangular shaped guide grooves 91 of the back plate 3. Also, instead of engaging the blade elements through holes in their side faces with the driving wheel, the rear edges of these blades may be formed as teeth 95 (see Figure 15) with which may be engaged complemental teeth 96 of a drive wheel or pinion carried by a shaft 97, which is connected through bevel gears 98 and 99 with the motor shaft 57a.

As is usual with this type of machine, a handle 100 may extend backwardly from the standard and this handle may be grasped by the operator. Conveniently arranged with respect thereto may be the motor control switch handle 101. A presser foot 102 of conventional type having a portion 103 bearing on the upper face of the pile of cloth may be employed. A blade sharpening device, carrying sharpening wheels 104, may be carried by a hanger 105 pivoted at 106 to the presser foot support 107 and this blade sharpening device may be pulled back into operative position by exerting backward pull on a hooked rod 107 conveniently located with reference to the handle 100 and secured at its forward end to the hanger 105.

From the foregoing description of certain embodiments of this invention, it should be evident to those skilled in the art that various other modifications and changes might be made without departing from the spirit or scope of this invention.

I claim:

1. A cutting machine, comprising members defining an endless track, a series of separate cutting elements guided for motion by said members around said track, adjacent elements contacting, and means located at one part of said track for successively engaging said elements and pushing the series of elements around said track.

2. A cutting machine, comprising a base, a standard rising from said base, said standard and base defining a continuous closed path having a straight front, a plurality of cutting elements guided for motion in said closed path and presenting a continuous cutting edge at said straight front, and means actuable to push said elements around said path.

3. A cutting machine, comprising a base, a standard rising from said base, said standard and base defining a continuous closed path having a straight front, a plurality of cutting elements guided for motion in said closed path and presenting a continuous cutting edge at said straight front, and means actuable to push said elements around said path, said cutting elements having interfitting edge portions.

4. A cutting machine, comprising a base, a standard rising from said base, said standard and base defining a continuous closed path having a straight front, a plurality of cutting elements guided for motion in said closed path and presenting a continuous cutting edge at said straight front, and means actuable to push said elements around said path, said elements having mating laterally convex and concave portions retaining the cutting edges of the elements in the straight front of said path in alinement and permitting relative lateral rocking of said elements in another portion of said path.

5. A cutting machine, comprising a base, a standard rising from said base, said standard and base defining a continuous closed path, a plurality of cutting elements guided for motion in said closed path, said elements having holes therein, a wheel having teeth successively engageable in said holes as said wheel rotates, and means for rotating said wheel.

6. A cutting machine, comprising a base, a standard rising from said base, said standard and base having mating grooves defining an endless path including a forward straight stretch, a series of cutting elements carried by said base and standard, each having a guide element engaging in said groove and guided for motion thereby, said cutting elements in said forward stretch presenting a continuous forward cutting edge, and means for pushing said cutting elements in one direction as guided by said guide elements in said path.

7. A cutting machine, comprising a base, a standard rising from said base, said standard and base having mating grooves defining an endless path including a forward straight stretch, a series of cutting elements carried by said base and standard each having a pocket therein, a ball in each of said pockets projecting into and guided for motion in said groove, said cutting elements in said forward stretch presenting a continuous forward cutting edge, and means for pushing said cutting elements in one direction as guided by said balls in said path.

8. A cutting machine, comprising a base, a standard rising from said base, said standard and base having mating guide portions defining an endless path having a pair of stretches at least one of which is straight arranged lengthwise of said standard, and arcuate portions joining the ends of said pair of stretches, a member movable in the direction of said straight stretch carrying a portion of said path including one of said arcuate portions, a series of cutting elements, each having a guide part cooperating with said guide portions, said elements substantially filling a closed circuit defined by said path, means yieldingly pressing said member in a direction to shorten said path, and means for moving said cutting elements around said path.

9. A cutting machine, comprising a base, a standard rising from said base, said standard having an upright slideway at its upper end, a slide movable in said slideway, said standard, base and slide having mating guide portions defining an endless path having a pair of straight stretches arranged lengthwise of said standard and arcuate portions joining the ends of said straight stretches, one of said arcuate portions being carried by said base and the other of said arcuate portions being carried by said slide, yielding means tending to hold said slide in its lowest position in which said path is shortest, a series of blade elements guided by said guide portion to move in said path and presenting cutting edges exposed in a portion of one of said straight stretches, and means for moving said blade elements around said path.

10. A cutting machine, comprising a base, a standard rising from said base, said standard having an upright slideway at its upper end, a slide movable in said slideway, said standard, base and slide having mating guide portions defining an endless path having a pair of straight stretches arranged lengthwise of said standard and arcuate portions joining the ends of said straight stretches, one of said arcuate portions being carried by said base and the other of said arcuate portions being carried by said slide, yielding means tending to hold said slide in its lowest position in which said path is shortest, a series of blade elements guided by said guide portion to move in said path and presenting cutting edges exposed in a portion of one of said straight stretches, a back strip between said straight stretches and against which the blades having their cutting edges exposed bear at their back faces, and means for moving said blade elements around said path.

11. A cutting machine, comprising a base, a standard rising from said base, said standard and base having means defining a continuous closed path having a straight front, said path in said base having a horizontal loop portion, said base having a depression therein, and a wear piece containing said looped portion set in said depression, cutting blades guided for motion in said path, and means for moving said blades in one direction around said path.

12. A cutting machine comprising members defining an endless track at least a portion of said track being circular, a series of cutting elements arranged around said endless track, balls guided for motion by said track and controlling the positions of said elements, a disk journaled centrally with said circular guide portion and holding said elements in guiding relation thereto, and means for driving said elements around said track.

13. A cutting machine comprising members defining an endless track at least a portion of said track being circular, a series of cutting elements arranged around said endless track, balls guided for motion by said track and controlling the positions of said elements, a disk journaled centrally with said circular guide portion and holding said elements in guiding relation thereto, and means for driving said elements around said track, said journal comprising a pivot screw adjustable to regulate the pressure with which said elements are held to said circular track portion.

14. A cutting machine, comprising a base, a standard rising from said base, said standard and base having mating track portions defining an endless path, a series of cutting elements guided by said track portions substantially filling said path and having outwardly facing cutting edges and spaced teeth at their inner edges, a wheel having outwardly projecting teeth engageable between the teeth of said elements at one portion of said path, and means for rotating said wheel.

FLOYD H. OGDEN.